June 16, 1931.  H. E. HERSHEY  1,810,211
REGISTERING SYSTEM
Filed Nov. 12, 1928
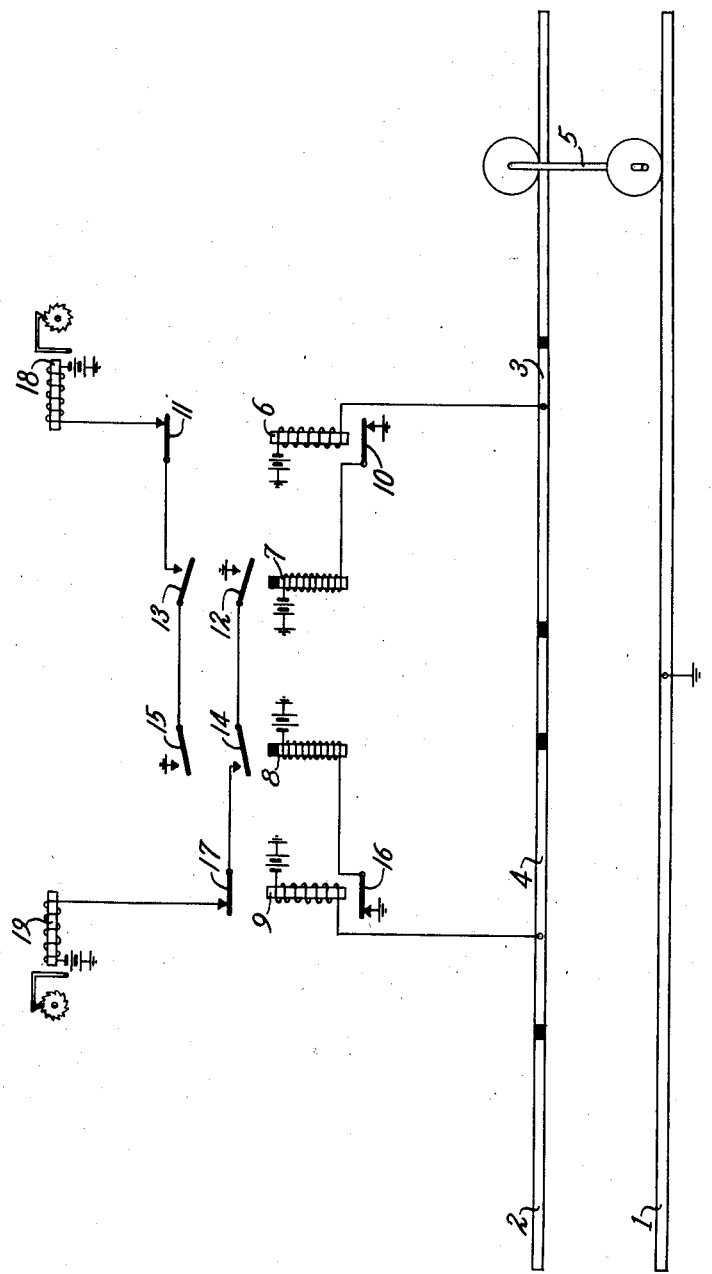
Inventor
Harry E. Hershey
Atty.

Patented June 16, 1931

1,810,211

UNITED STATES PATENT OFFICE

HARRY E. HERSHEY, OF OAK PARK, ILLINOIS, ASSIGNOR TO RESERVE HOLDING COMPANY, OF KANSAS CITY, MISSOURI, A CORPORATION OF DELAWARE

REGISTERING SYSTEM

Application filed November 12, 1928. Serial No. 318,715.

This invention relates to metering systems in general, and more particularly to such a system in which objects passing a certain point, or position, are automatically counted and the count registered on meters.

The principal object of this invention is the provision of an arrangement for counting the number of railway cars which pass over a certain section of track and indicating the direction of passing.

The arrangement is particularly adapted for use in railroad yards where a great number of cars are brought up an incline and then sent down the reverse side of the incline to various destinations about the yard, a count of the cars going over this "hump" in both directions being desired.

Other objects and features will be evident with an understanding of the invention from the detailed description and claims which follow, when taken in conjunction with the single sheet of drawing.

In the drawing, reference numerals 1 and 2 indicate the rails of a section of track which is assumed to be one on the "hump". Rail 1 is grounded as indicated. Rail 2 has the sections 3 and 4 which are insulated from each other and from the rest of the track. Each section 3 and 4 is long enough to receive both trucks of a car and the sections are close enough together so that when one truck is on section 3 for example, the other truck will be on section 4.

It will first be assumed that a car going from the right to the left will pass over the section of track. Accordingly, when the front truck of the car, represented by the wheel and axel assembly 5, passes onto section 3, the wheels and axel will join grounded track 1 in a circuit with section 3, thus completing the obvious circuit for quick-acting relay 6 whose winding is connected to section 3. Relay 6 energizes and attracts its armatures 10 and 11. At armature 10, ground is disconnected from the normally energized winding of relay 7 and relay 7 deenergizes. At armature 11, relay 6 opens the circuit of meter operating magnet 18.

Relay 7, in deenergizing, retracts its armatures 12 and 13 and those armatures engage their resting contacts. At armature 12, ground is connected to armature 14 of relay 8. At armature 13, armature 15 of relay 8 is joined in circuit with armature 11 of relay 7.

As the car progresses to the left, the rear truck will run onto section 3 to maintain the circuits completed by the front truck when the front truck leaves section 3. An interval thereafter, the front truck will run off of section 3 and on to section 4. When on section 4, the circuit for relay 9 is completed from ground on rail 1. Relay 9 energizes and attracts its armatures 16 and 17, armature 17 being attracted before armature 14 of relay 8 is allowed to retract. At armature 17, the circuit of meter operating relay 19 is opened. At armature 16, ground is disconnected from the normally energized winding of relay 8. Relay 8, therefore deenergizes and retracts its armatures 14 and 15. At armature 14, armature 17 of relay 9 is joined in circuit with armature 12 of relay 7 and is, therefore, connected to ground.

With further progression of the car to the left the rear truck will run off of section 3. When this is done, the circuit of relay 6 is no longer complete and relay 6 deenergizes, retracting its armatures 10 and 11. The retraction of armatures 10 and 11 closes the circuits for relay 7 and meter operating relay 18 simultaneously. However, because of the copper slug on the armature end of its core, relay 7 is slow to pull-up. If relay 7 were quick to pull up, it would open the circuit of relay 18 before that relay had had time to energize. However, since the relay does not pull up for an instant, relay 18 will energize to operate a meter in the well known manner to register the passing of a car from right to left. After an interval relay 7 will energize and attract its armatures 12 and 13 to remove ground from armature 17 of relay 9 and to open the circuit of relay 18.

When the rear truck passes off of section 4 the circuit of relay 9 is opened and that relay deenergizes and retracts its armatures 16 and 17. When armature 17 engages its resting contact, no circuit is completed for meter operating relay 19 because ground has been removed from armature 12 of relay 7. When armature 16 engages its resting contact, the circuit of relay 8 is completed and relay 8 energizes after an interval and attracts its armatures 14 and 15. The equipment is now in the position shown in the drawing and ready to register another count.

When a car goes from left to right, relays 9, 8, 6 and 7 operate in the order named. When the rear truck passes off of section 4 relay 9 deenergizes to complete the circuit for meter operating relay 19 and the rest of the equipment will function in a similar, but reverse, manner as when the car passed from right to left.

Although two meters have been shown, one for registering the number of cars passing in one direction and one for registering the number of cars passing in the other direction, a device may be used which will register the number of cars going, for example, into the freight yards, and subtract from that number the cars going out of the yards to show an accurate account of the number of cars in the yards at all times. In that case, relay 18 would be used to advance the device a step every time a car entered the yards and relay 19 would be used to set the device back a step every time a car left the yards.

Although I have chosen the foregoing example as an illustration of one application of my invention, I do not intend to be limited to the exact disclosure for there are adaptations and alterations which can be made by those skilled in the art without departing from the spirit or scope of the invention.

Having thus described my invention, what I consider new and desire to have protected by Letters Patent is pointed out in the appended claims.

What is claimed is:

1. In a metering system, a plurality of meters, a plurality of relays associated therewith, and means for operating said relays in a predetermined order to operate a certain one of said meters and to operate said relays in the reverse order to operate another one of said meters.

2. In a metering system, a plurality of meters, an operating circuit for each meter, a plurality of relays for closing said circuits, means for operating said relays in a predetermined order to close a certain one of said circuits and operating said relays in a reverse order to close a certain other one of said circuits, each meter operatively responsive to the closing of its associated circuit.

3. In a metering system, a pair of meters, a plurality of relays, means for operating said relays in a predetermined order, and circuit means responsive to said operation for operating a certain one of said meters, said circuit means responsive to the reverse order of operation of said relays for operating the other meter.

4. In a railway car counting system, a pair of meters, a plurality of relays, meter operating circuit means for said meters and controlled by said relays, and track sections, said relays operating in a predetermined order when a car traverses said sections in one direction for controlling said circuit means to operate a certain one of said meters.

5. In a metering system, a plurality of meters, a plurality of relays, means for operating said relays in a plurality of sequences, and means responsive to an operation of said relays in each sequence for operating one of said meters, the meter operated determined by the sequence of operation of the relays.

6. In a railway car counting system, a pair of rails, one of said rails connected to ground and the other divided in sections insulated from each other, a normally deenergized track relay connected to each section and operated when a car truck short circuits the associated section and the grounded rail, a pair of registering devices, and circuit connections for said devices, said relays operating in a definite sequence when a car short circuits said sections in a certain order to control said circuit connections to select and operate a certain one of said devices.

7. In a railway car counting system, a pair of rails, one of said rails connected to ground and the other divided into two sections insulated from each other, a pair of relays associated with each section and operated when a car truck short circuits the associated section and the grounded rail, a pair of registering devices, and circuit connections for said devices, said pairs of relays operating in a definite sequence when a car short circuits said sections and cooperating to control said circuit connections to select and operate a certain one of said devices.

In witness whereof, I hereunto subscribe my name this 9th day of November, A. D. 1928.

HARRY E. HERSHEY.